(12) United States Patent
Rettig et al.

(10) Patent No.: US 7,261,046 B1
(45) Date of Patent: Aug. 28, 2007

(54) SYSTEM AND METHOD OF REDUCING PULVERIZER FLAMMABILITY HAZARD AND BOILER NITROUS OXIDE OUTPUT

(75) Inventors: Terry W. Rettig, Los Altos, CA (US); T. Steven I. Torbov, San Jose, CA (US); Thomas D. Burnett, Houston, TX (US); Kimble J. Clark, Los Altos, CA (US)

(73) Assignee: Aptech Engineering Services, Inc., Sunnyvale, CA (US)

( * ) Notice: Subject to any disclaimer, the term of this patent is extended or adjusted under 35 U.S.C. 154(b) by 0 days.

(21) Appl. No.: 10/866,355

(22) Filed: Jun. 10, 2004

Related U.S. Application Data

(60) Provisional application No. 60/477,493, filed on Jun. 10, 2003.

(51) Int. Cl.
*F23J 15/00* (2006.01)
(52) U.S. Cl. .................. 110/345; 110/347; 110/204; 110/106
(58) Field of Classification Search ............ 110/345, 110/347, 106, 204, 348, 232, 302; 122/1 A, 122/DIG. 162
See application file for complete search history.

(56) References Cited

U.S. PATENT DOCUMENTS

| | | | |
|---|---|---|---|
| 3,246,635 A * | 4/1966 | Powell et al. ............. 122/479.1 |
| 4,056,068 A | 11/1977 | Hafeli ....................... 110/8 A |
| 4,223,640 A | 9/1980 | Rochford et al. ........... 122/1 R |
| 4,411,204 A * | 10/1983 | Hamilton ..................... 110/347 |
| 4,498,402 A | 2/1985 | Kober et al. ................. 110/345 |
| 4,616,574 A | 10/1986 | Abrams et al. ............. 110/343 |
| 4,642,225 A | 2/1987 | Leikert ....................... 423/244 |
| 4,796,548 A | 1/1989 | Merrell et al. .............. 110/343 |
| 4,873,930 A | 10/1989 | Egense et al. .............. 110/345 |
| 5,309,850 A | 5/1994 | Downs et al. .............. 110/235 |
| 5,313,895 A | 5/1994 | Sekiguchi et al. .......... 110/346 |
| 5,683,550 A | 11/1997 | Ryham ....................... 162/30.1 |
| 5,685,243 A | 11/1997 | Gohara et al. ............. 110/345 |
| 6,213,032 B1 | 4/2001 | Breen et al. ................ 110/345 |
| 6,280,695 B1 * | 8/2001 | Lissianski et al. ........ 423/239.1 |

* cited by examiner

*Primary Examiner*—Kenneth Rinehart
(74) *Attorney, Agent, or Firm*—Haverstock & Owens LLP

(57) ABSTRACT

The present invention is a system and method of reducing nitrogen oxides in coal combustion exhaust gases and preventing fire and explosion in pulverized coal systems. The present invention first cools the flue gas exiting a boiler of the pulverized coal system with an air preheater. The present invention removes any particles such as fly ash from the cooled flue gas with an electro-static precipitor or a bag house and recirculates the flue gas. The temperature of the recirculated flue gas is adjusted to a desired temperature and is injected into the pulverizer with combustion air from the air preheater, creating a safer environment for pulverizing the fuel. This mixture of pulverized fuel, air and flue gas is then burned in the boiler, resulting in a cleaner output containing significantly less nitrous oxide.

12 Claims, 6 Drawing Sheets

SYSTEM AND METHOD OF REDUCING PULVERIZER FLAMMABILITY HAZARD AND BOILER NITROUS OXIDE OUTPUT

RELATED APPLICATIONS

This patent application claims priority under 35 U.S.C. § 119 (e) of the now abandoned U.S. Provisional Patent Application Ser. No. 60/477,493, filed Jun. 10, 2003, and entitled, "SYSTEM AND METHOD FOR REDUCING COMBUSTIBILITY AND NITROUS OXIDE OUTPUT." The Provisional Patent Application Ser. No. 60/477,493, filed Jun. 10, 2003, and entitled, "SYSTEM AND METHOD FOR REDUCING COMBUSTIBILITY AND NITROUS OXIDE OUTPUT" is also hereby incorporated by reference in its entirety.

FIELD OF THE INVENTION

The present invention relates generally to the field of power plant operation. More specifically, the present invention relates to the field of pulverizer operation and boiler nitrous oxide output in power plant operation.

BACKGROUND OF THE INVENTION

When burning coal, the nitrogen content in the fuel organic mass and the nitrogen from the combustion air are oxidized to form nitrogen oxides ($NO_x$) in the exhaust, or flue gas. There are different methods for reducing the nitrogen oxides formed in a coal combustion process. They are achieved using air staging, burner staging and fuel reburning, as well as many others. The general concept is to create a substoichiometric zone in the furnace, where different radicals are formed, including CN, OH, among others. These radicals at certain ranges of flue gas temperature and residence time promote reactions which will reduce the $NO_x$ formed in the flame to $N_2$.

Normally, in the pulverizing systems for the combustion of subbituminous and bituminous coals, different types of ring-roll or ball-race mills are used. In general, these are direct-fired pulverized coal systems where the drying and transportation agent is primary hot air, heated by the air preheater and redirected back to the pulverizer.

Possible fires and explosions in pulverizers and in the duct system after pulverizers are controlled by maintaining the temperature within certain limits depending on the type of coal. To prevent explosions when fire occurs in the pulverized coal duct system, inert agents such as carbon dioxide ($CO_2$), nitrogen ($N_2$) or steam are used which are injected into the pulverizer/coal duct after the pulverizer.

FIG. 1 depicts a block diagram of the architecture of a typical bituminous or sub-bituminous coal burning power plant. Specifically, FIG. 1 depicts a boiler system 100 of the prior art including a boiler 102, an air preheater 106, an electro-static precipitator 104 and a pulverizer 110. In operation, flue gas created by the coal flame 120 in the boiler 102 travels through a flue gas duct 116 to the air preheater 106, where the flue gas is cooled and further sent through the flue gas duct 116 to the electro-static precipitator 104. The electro-static precipitator 104 is configured to remove any particles or pollutants from the flue gas such as fly ash, and then discharges the flue gas from the boiler system 100.

Still referring to FIG. 1, outside air is brought into the boiler system 100 through the cool air duct 114. Depending upon the temperature requirements of the boiler system 100, a portion of this air will be heated with the air preheater 106, while the remainder of the air travels through the cool air duct 114, and is injected into the pulverizer 110. The outside air that is heated by the air preheater 106 travels through the hot air duct 112 and is split, a portion traveling to the boiler 102 for combustion, while the remainder is injected into the pulverizer 110 to adjust the temperature inside the pulverizer 110 as required by the boiler system 100. The fuel port 108 delivers coal to the pulverizer 110 and the pulverized fuel duct 118 delivers the pulverized coal and outside air mixture to the boiler 102 where it is burned in the coal flame 120.

The boiler system 100 depicted in FIG. 1 embodies the problems described above as the combustion of the mixture of outside air and coal creates a relatively large amount of nitrous oxide that is then discharged with the flue gas. Furthermore, the outside air in this mixture contains a significant amount of oxygen, which can make the fuel/air mixture coming out of the pulverizer flammable and explosive.

SUMMARY OF THE INVENTION

The present invention is a system and method of simultaneously reducing nitrogen oxides in coal combustion exhaust gases and preventing fire and explosion in pulverized coal systems. The present invention first cools the flue gas exiting a boiler of the pulverized coal system with an air preheater. The present invention removes any particles such as fly ash from the cooled flue gas with an electro-static precipitor or a bag house and recirculates a portion of the flue gas. The temperature of the recirculated flue gas is adjusted to a desired temperature by adding cold or hot combustion air upstream or downstream of the air preheater and is injected into the pulverizer, creating a less flammable environment for pulverizing the fuel. This mixture of pulverized fuel, air and flue gas is then burned in the boiler, resulting in a cleaner output containing significantly less nitrous oxide.

In one aspect of the present invention, a method of reducing nitrous oxide output and reducing pulverizer flammability in a coal-fired steam boiler system comprises cooling flue gas from the output of a boiler, wherein the boiler burns a fuel, air, and flue gas mixture to create the flue gas, cleaning the flue gas utilizing a flue gas filter configured to remove particles from the cooled flue gas, recirculating a portion of the flue gas from the output of the flue gas filter, adjusting the temperature of the flue gas used as a drying agent in the pulverizer according to a set of predetermined requirements, injecting the recirculated flue gas into a pulverizer together with cold or hot combustion air, mixing it with the coal in the pulverizer, to produce a second fuel/flue gas/air mixture and burning the second mixture in the boiler, wherein the second mixture is less flammable in the region of the pulverizer than the first fuel mixture from coal, and further wherein when the second mixture is burned in the boiler, a reduced nitrous oxide output is achieved.

The flue gas filter receives the flue gas from an air preheater, further wherein the air preheater is configured to effectuate the cooling step, and the air preheater is configured to effectuate the adjusting step. The flue gas filter is an electrostatic precipitator or a bag house. The first fuel mixture includes coal and air.

In another aspects of the present invention, a system for reducing nitrous oxide output and reducing pulverizer flammability in a coal-fired steam boiler system comprises means for cooling flue gas from the output of a boiler, wherein the boiler burns a first fuel mixture to create the flue gas, means for cleaning the flue gas utilizing a flue gas filter configured to remove particles from the cooled flue gas, means for recirculating a portion of the flue gas from the output of the flue gas filter, means for adjusting the temperature of the recirculated flue gas by adding cold or hot air according to a set of predetermined requirements, means for injecting the recirculated flue gas and air into a pulverizer, means for mixing the recirculated flue gas and air with the coal in the pulverizer, to produce a second fuel/flue gas/air mixture and means for burning the second mixture in the boiler, wherein the second mixture is less flammable in the region of the pulverizer than the first mixture, and further wherein when the second mixture is burned in the boiler, a reduced nitrous oxide output is achieved.

The flue gas filter receives the flue gas from an air preheater, further wherein the means for cooling include the air preheater. The flue gas filter is an electrostatic precipitator or a bag house. The first fuel mixture includes coal and air.

In yet another aspect of the present invention, a system for reducing nitrous oxide output and reducing pulverizer flammability in a coal-fired steam boiler comprises an air preheater configured to receive flue gas from the output of a boiler, and further configured to cool the flue gas, a flue gas filter coupled to the air preheater and configured to clean the flue gas, a flue gas duct coupled to the flue gas filter, wherein the flue gas duct is configured to recirculate a portion of the flue gas, at least one fan configured to propel the recirculated flue gas through the flue gas duct and further configured to propel the recirculated flue gas back through the air preheater to adjust the temperature of the flue gas according to a set of predetermined requirements and a pulverizer configured to mix the recirculated flue gas with a first fuel mixture to produce a second fuel mixture, wherein the second fuel mixture is less flammable in the region of the pulverizer than the first fuel mixture, and further wherein when the second fuel mixture is burned in the boiler, a reduced nitrous oxide output is achieved. The flue gas filter is an electrostatic precipitator or a bag house. The first fuel mixture includes coal and air.

DETAILED DESCRIPTION OF THE INVENTION

The present invention is a system and method of both reducing gaseous nitrogen oxides in the combustion of pulverized coal and preventing fires and explosions in the pulverized coal system in and after the pulverizer. The system and method are preferably utilized in the pulverizing systems for the combustion of sub-bituminous and bituminous coals, where clean flue gas, substantially free of fly ash, is extracted from the flue gas duct. The clean flue gas can be taken, after exiting the electrostatic precipitator (ESP) or the bag house (BH), and injected into the primary air. This could be done two ways: the flue gas recirculation (FGR) can be introduced into the suction duct of the primary air forced draft (FD) fan (FIG. 3), or the FGR can be introduced at the same location using a separate FGR fan (FIG. 4). In both cases, the cold primary air ducts remain unchanged and the cold primary air is used for additional tempering of the hot primary air if necessary.

The recirculated flue gas provides tempering of the hot primary air at the pulverizer inlet in order to maintain required temperature limits after the pulverizer. The $CO_2$ in the flue gas and the lower $O_2$ content provide a less reactive gas mixture after the pulverizer which reduces the possibility for explosion and fire in the pulverizer and coal delivery system.

Figure 5:
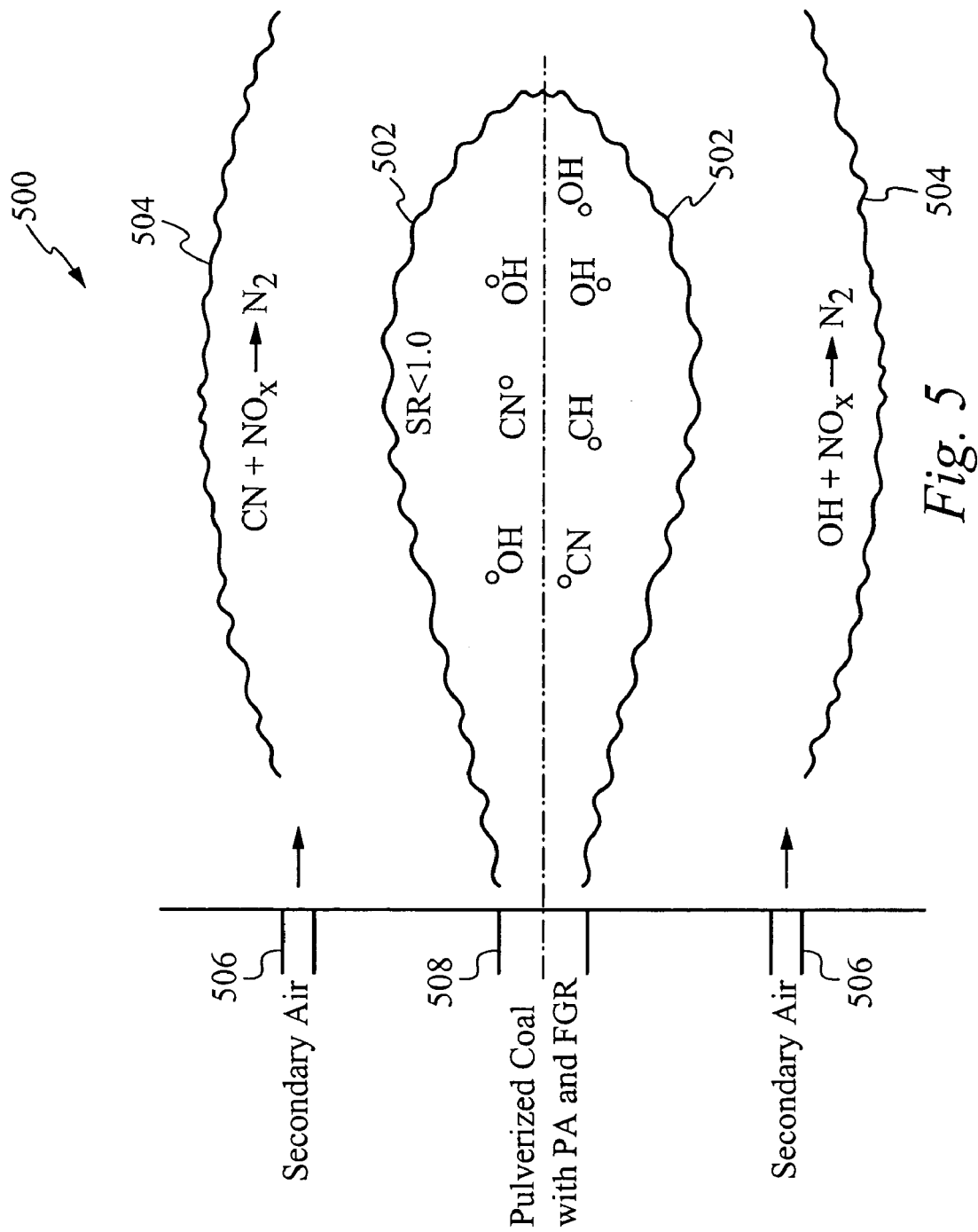
FIG. 5 is a schematic diagram illustrating a coal flame with FGR in the primary air according to an embodiment of the present invention.

The FGR in the primary air helps to create a reducing atmosphere zone in the primary air flame where different radicals are formed such as OH and CN, which later react with the nitrogen oxides formed in the secondary flame, reducing the formation of nitrogen oxides and emissions from the stack (FIG. 5). The amount of flue gas injected into the air delivery system is adjusted, depending on the level of oxygen required to achieve stable ignition and combustion and provide $NO_x$ reduction.

Figure 1:
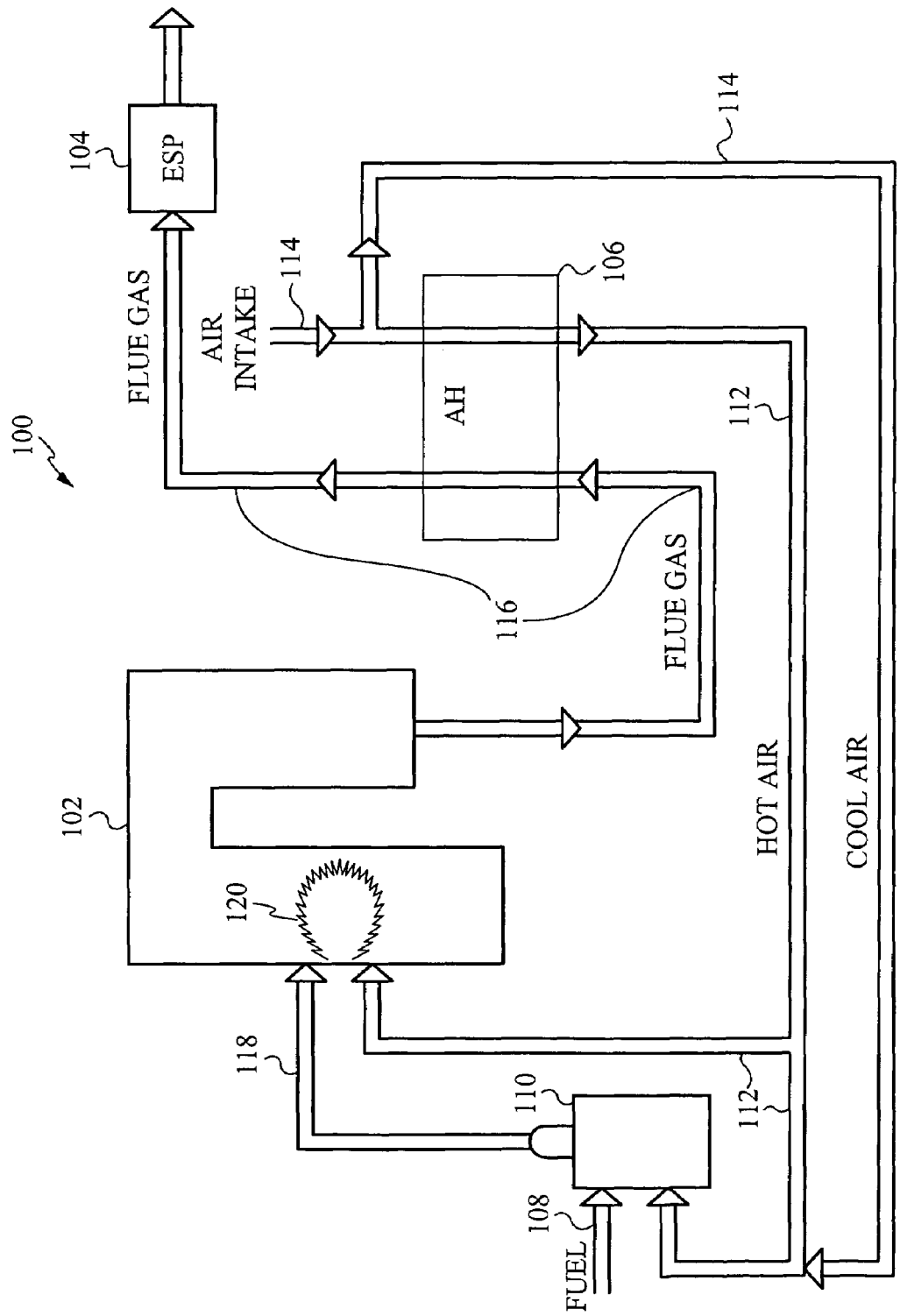
FIG. 1 is a block diagram illustrating an exemplary coal-fired utility system according to the prior art.
Figure 2:
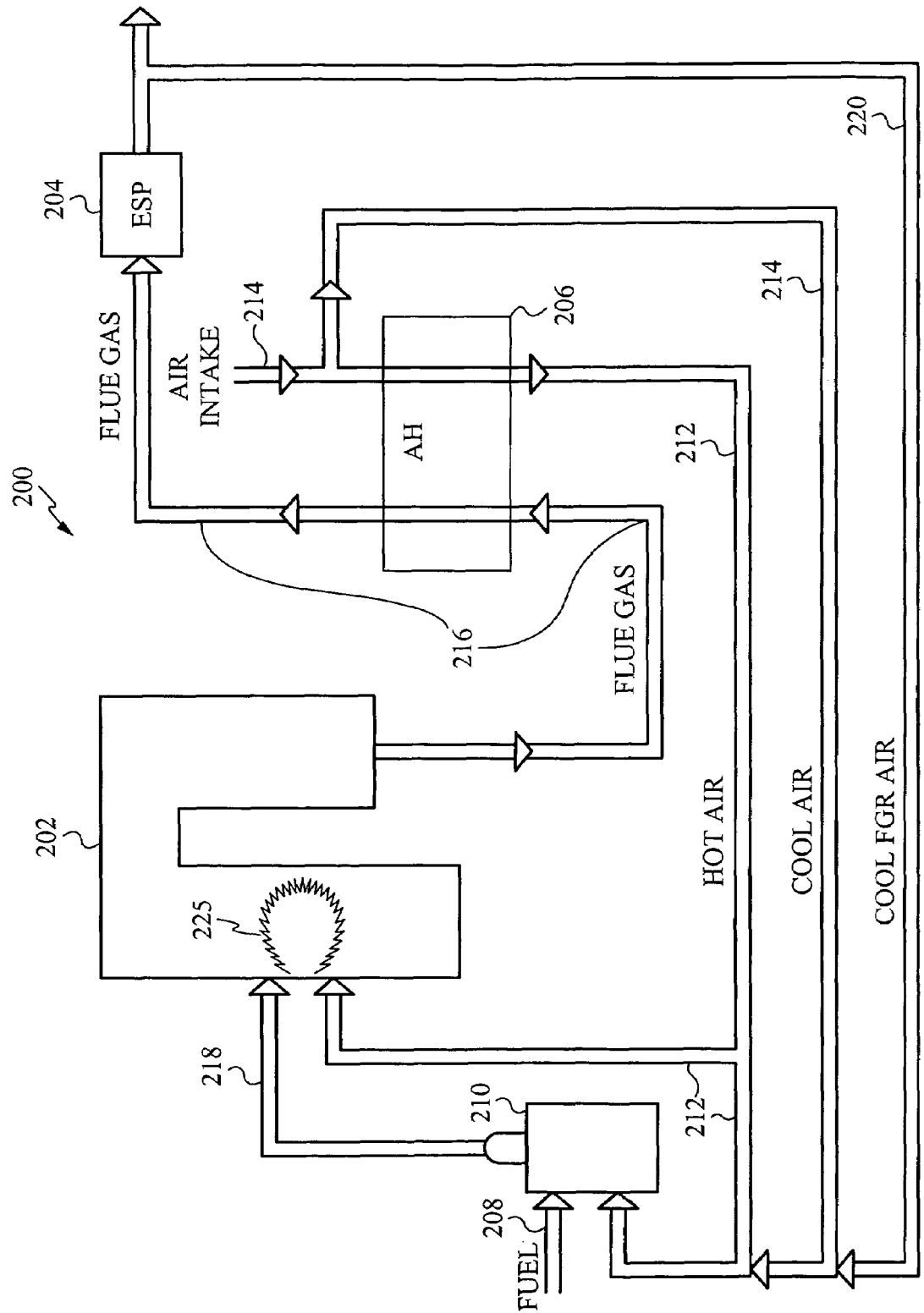
FIG. 2 is a block diagram illustrating a simplified furnace system according to an embodiment of the present invention.

An embodiment of the present invention is depicted in FIG. 2. Here, a boiler system 200 includes a boiler 202, an air preheater 206, an electro-static precipitator 204 and a pulverizer 210. Flue gas leaves the boiler 202 through a flue gas duct 216 and passes through the air preheater 206, where the flue gas is cooled. The flue gas duct 216 then directs the cooled flue gas to an electro-static precipitator 204, where substantially all the particles such as fly ash are removed from the flue gas. In an alternative embodiment, a bag house can replace or be used in conjunction with the electro-static precipitator 204 to remove the particles from the flue gas.

The flue gas recirculation (FGR) duct 220 directs a portion of the cooled and cleaned flue gas toward, and injects the flue gas into the pulverizer 210. The pulverizer 210 also receives combustion air from the hot air duct 212 and the cool air duct 214, where the hot air duct 212 brings the pulverizer 210 air from the air preheater 206. The pulverizer 210 mixes the hot and cool combustion air, the FGR and coal from the fuel duct 208. The pulverized fuel duct 218 delivers this mixture to the boiler 202, where it is burned in the coal flame 225 with combustion air from the hot air duct 212.

Figure 3:
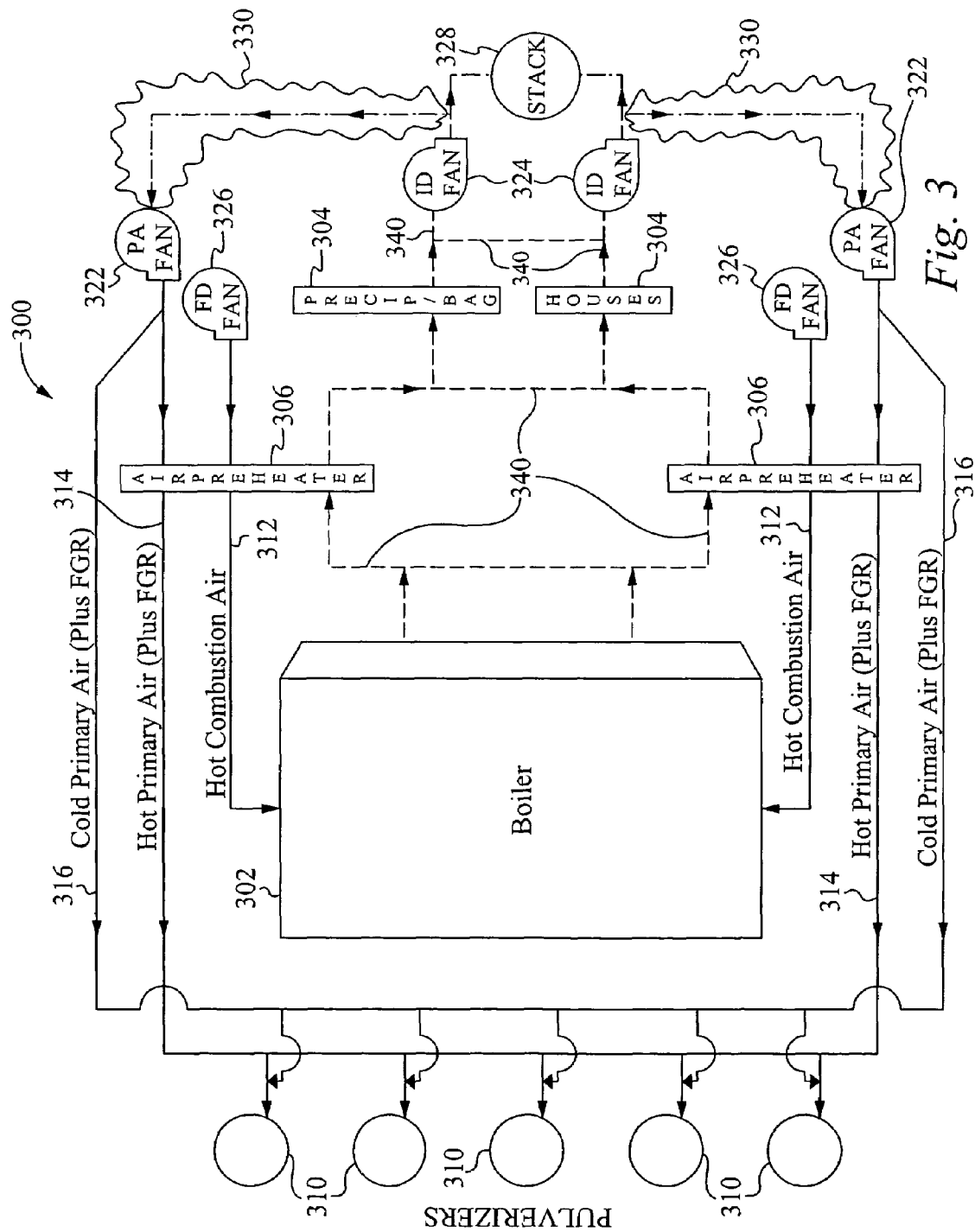
FIG. 3 is a schematic diagram illustrating introduction of flue gas recirculation (FGR) into the primary air system according to an embodiment of the present invention.
Figure 4:
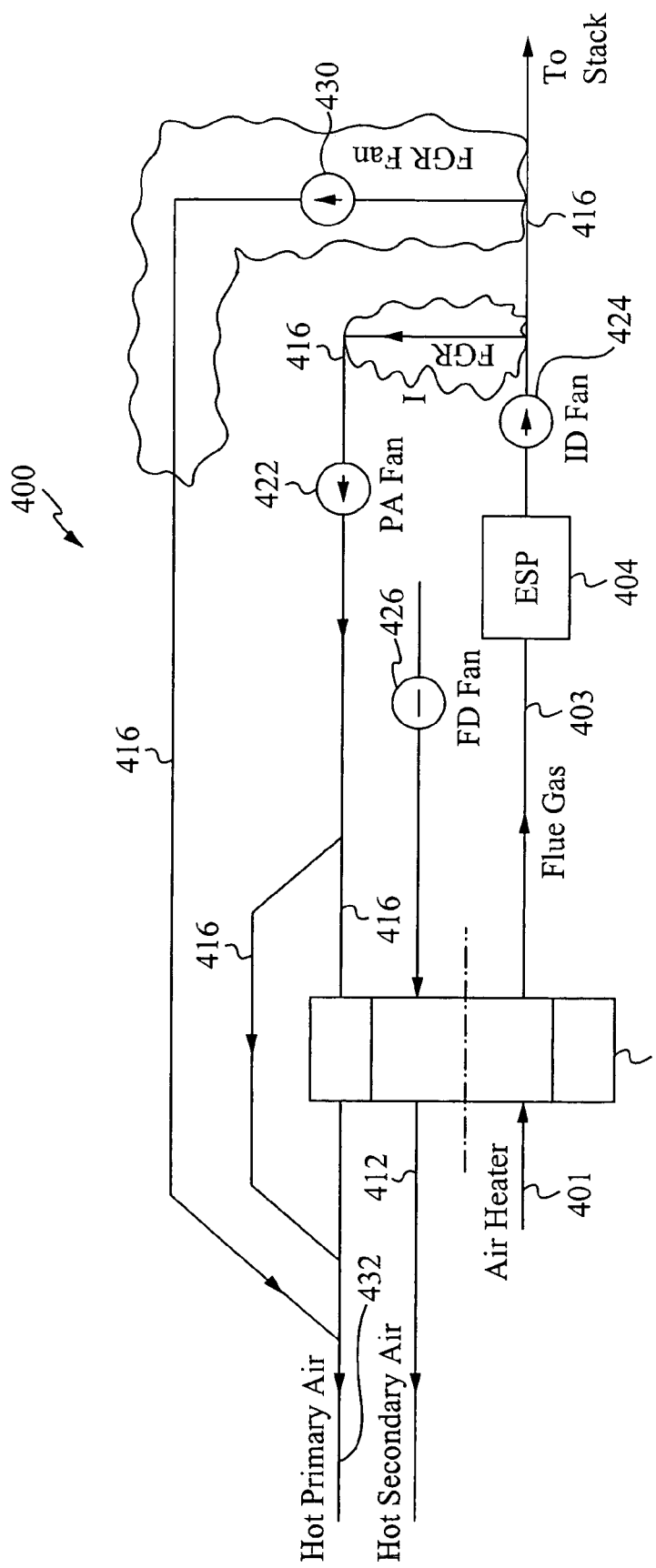
FIG. 4 is a schematic diagram illustrating the location of the FGR introduction into the primary air system according to an embodiment of the present invention.

FIG. 3 depicts a schematic illustration of a boiler system 300 of an embodiment of the present invention. Specifically, FIG. 3 illustrates the introduction of the FGR into the primary air system. The flue gas 340 leaves the boiler 302 and is cooled in either an electro-static precipitator 304, a bag house 304 or some combination of the two elements. The ID fan 324 pushes the cooled flue gas 340 either out of the boiler system 300 through the stack 328, or pushes a portion of the cooled flue gas 340 to FGR 330 to the PA fan 322. The PA fan 322 then pushes the FGR 330 such that multiple pulverizers 310 receive hot primary air with FGR from a hot FGR duct 314 through the air preheater 30, and cold primary air with FGR from a cold FGR duct 316.

Still referring to FIG. 3, it should be noted that the number of pulverizers 310 and other components shown in this embodiment are exemplary, as the number of the components utilized by this boiler system 300 can be increased or decreased as required by the particular boiler system's 300 needs. As described previously, the pulverizers 310 supply the boiler 302 with the fuel/air mixture (not shown in FIG. 3) and burn this mixture with hot combustion air 312 from an air forced draft (FD) fan 326, through the air preheater 306. As stated previously, the introduction of the FGR 330 into the pulverizer, and ultimately into the boiler 302, creates a cleaner flue gas 340 with lower nitrous oxide concentration.

FIG. 4 depicts the location of the FGR 416 introduction in to the primary air system of and embodiment of the present invention. Here, the air preheater 406 receives hot flue gas 401 from the boiler and cooled flue gas 403 from the air preheater 4036 enters the electro-static precipitator 404, where the fly ash is again removed. The ID fan 424 pushes the FGR 416 which is a portion of the total flue gas partly to a PA fan 422 and partly to an FGR fan 430. The remainder of the total flue gas goes to the stack. The PA fan 422 pushes the FGR 416 to the air preheater 406 where, depending on the current temperature needs of the system, the amount of FGR 416 that is heated by the air preheater 406 may be adjusted by allowing a portion of the FGR 416 to bypass the air preheater 406. Thus, the FGR 416 pushed by the PA fan 422 and the FGR 416 pushed by the FGR fan 430 make up the hot primary air 432 that is injected into the pulverizer (not shown). Further, the FD fan 426 pushes secondary air through 412 the air preheater 406 to heat the secondary air before it is injected into the boiler (not shown).

FIG. 5 depicts the coal flame 500 in the boiler of the present invention. The coal flame 500 includes a primary flame 502 and a secondary flame 504. The fuel mixture 508 including the pulverized coal and the primary air with the FGR is inserted and ignited in the boiler and creates the primary flame 502. The FGR in the primary air and fuel mixture 508 creates a reducing atmosphere in the primary flame 502, forming radicals such as hydroxide (OH) and cyanide (CN). These radicals OH, CN, combine with $NO_x$ present in the secondary flame to form nitrogen $N_2$, thus greatly reducing the amount of $NO_x$ released from the boiler.

Figure 6:
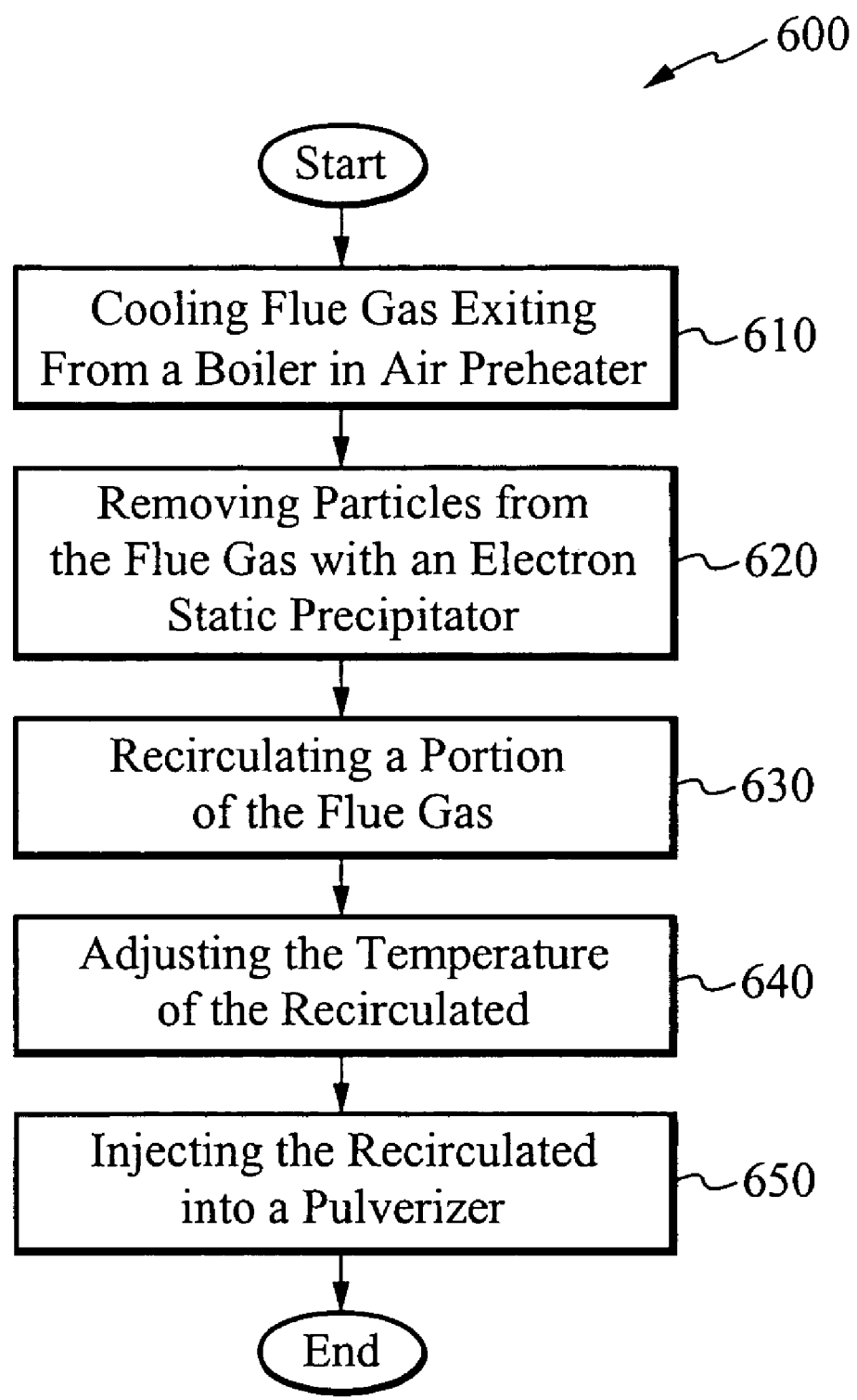
FIG. 6 is a flow chart illustrating a method according to an embodiment of the present invention.

FIG. 6 depicts a method of an embodiment of the present invention. In step 610, flue gas exiting from a boiler is cooled in an air preheater. Of course it is contemplated that any air cooling device may be utilized to cool the flue gas. The cooled flue gas leaves the air preheater, and in step 620, particles including but not limited to fly ash are removed from the cooled flue gas. In the preferred embodiment, the particles are removed in step 620 by an electro-static precipitator. However, in additional embodiments, a bag house or other known methods, or even a combination of all of these particle removers may be utilized.

Still referring to FIG. 6, after the particles are removed from the cooled flue gas, a portion of this flue gas is recirculated in step 630. According to the requirements of the particular system, the temperature of the recirculated flue gas is adjusted in step 640 before it is injected into the pulverizer. In this step, the recirculated flue gas functions to lower the flammability of the fuel/gas mixture in the pulverizer while effectuating a resulting coal flame in the boiler with lower nitrous oxide concentration.

The above-described system and method lowers the flammability hazard in the pulverizer, especially in a system burning younger coals, by creating a less flammable fuel/gas mixture in the pulverizer. The system and method further reduces the $NO_x$ emissions of a boiler in such a system by creating a substoichiometric zone in the primary flame in the coal flame of the boiler, such that the OH and CN radicals are created to react with the $NO_x$ in the secondary flame to product nitrogen $N_2$.

The present invention is a system and method of reducing nitrogen oxides in coal combustion exhaust gases and preventing fire and explosion in pulverized coal systems. The present invention first cools the flue gas exiting a boiler of the pulverized coal system with an air preheater. The present invention removes any particles such as fly ash from the cooled flue gas with an electro-static precipitor or a bag house and recirculates a portion of the flue gas. The temperature of the mixture of recirculated flue gas and combustion air is adjusted to a desired temperature and is injected into the pulverizer with combustion air from the air preheater, creating a safer less flammable environment for pulverizing the fuel. This mixture of pulverized fuel, air and recirculated flue gas is then burned in the boiler, resulting in a cleaner output containing significantly less nitrous oxide.

What is claimed is:

1. A method of reducing nitrous oxide output and reducing pulverizer flammability in a coal-fired steam boiler system, the method comprising:
   receiving a primary air;
   heating a portion of the primary air to yield a heated air having a selected temperature;
   burning a first fuel mixture to produce a flue gas;
   cooling the flue gas;
   cleaning the flue gas utilizing a flue gas filter configured to remove particles from the flue gas to yield a cooled cleaned flue gas;
   recirculating a portion of the cooled cleaned flue gas from the output of the flue gas filter;
   admixing a selected amount of
      (i) the primary air,
      (ii) the heated air of the selected temperature, with
      (iii) the recirculated cooled cleaned flue gas,
   to form a control mixture with a controlled temperature according to a set of predetermined requirements;
   injecting the control mixture into a pulverizer, wherein the contents of the pulverizer include the first fuel air mixture;
   mixing the control mixture with the contents of the pulverizer, to produce a second fuel mixture; and
   burning the second fuel mixture in the boiler,
   wherein the second fuel mixture is less flammable than the first fuel mixture, and further
   wherein when the second fuel mixture is burned in the boiler, a reduced nitrous oxide output is achieved.

2. The method as claimed in claim 1 wherein the flue gas filter receives the flue gas from an air preheater, further wherein the air preheater is configured to effectuate the cooling step.

3. The method as claimed in claim 1 further comprising:
   adjusting the volatility of the contents of the pulverizer by using the control mixture, and
   directing a portion of the heated air for combustion during the step of burning the second fuel mixture.

4. The method as claimed in claim 1 wherein the flue gas filter is an electrostatic precipitator.

5. The method as claimed in claim 1 wherein the flue gas filter is a bag house.

6. The method as claimed in claim 1 wherein the first fuel mixture includes coal and air.

7. A system for reducing nitrous oxide output and reducing pulverizer flammability in a coal-fired steam boiler system, the system comprising:

a. means for cooling flue gas from the output of a boiler, wherein the boiler burns a first fuel air mixture to produce the flue gas;
b. means for cleaning the flue gas utilizing a flue gas filter configured to remove particles from the flue gas;
c. means for recirculating a portion of the flue gas from the output of the flue gas filter;
d. means for admixing a selected amount of:
   (i) a primary air,
   (ii) a heated air of a selected temperature with
   (iii) the recirculated flue gas
to form a control mixture with a controlled temperature according to a set of predetermined requirements;
e. means for injecting the control mixture into a pulverizer, wherein the contents of the pulverizer include the first fuel air mixture;
f. means for mixing the control mixture with the contents of the pulverizer, to produce a second fuel mixture; and
g. means for burning the second fuel mixture in the boiler, wherein the second fuel mixture is less flammable than the first fuel mixture, and further wherein when the second fuel mixture is burned in the boiler, a reduced nitrous oxide output is achieved.

8. The system as claimed in claim 7 wherein the flue gas filter receives the flue gas from an air preheater, further wherein the means for cooling include the air preheater.

9. The system as claimed in claim 8 further comprising:
means for adjusting a flammability of the contents of the pulverizer that include the cold air upstream of the air preheater, and
a duct for directing heated air from the preheater to the boiler.

10. The system as claimed in claim 7 wherein the flue gas filter is an electrostatic precipitator.

11. The system as claimed in claim 7 wherein the flue gas filter is a bag house.

12. The system as claimed in claim 7 wherein the first fuel mixture includes coal and air.

* * * * *

UNITED STATES PATENT AND TRADEMARK OFFICE
CERTIFICATE OF CORRECTION

| | |
|---|---|
| PATENT NO. | : 7,261,046 B1 |
| APPLICATION NO. | : 10/866355 |
| DATED | : August 28, 2007 |
| INVENTOR(S) | : Terry W. Rettig et al. |

It is certified that error appears in the above-identified patent and that said Letters Patent is hereby corrected as shown below:

ON THE TITLE PAGE

Item (57), ABSTRACT, please replace the paragraph

"The present invention is a system and method of reducing nitrogen oxides in coal combustion exhaust gases and preventing fire and explosion in pulverized coal systems. The present invention first cools the flue gas exiting a boiler of the pulverized coal system with an air preheater. The present invention removes any particles such as fly ash from the cooled flue gas with an electro-static precipitor or a bag house and recirculates the flue gas. The temperature of the recirculated flue gas is adjusted to a desired temperature and is injected into the pulverizer with combustion air from the air preheater, creating a safer environment for pulverizing the fuel. This mixture of pulverized fuel, air and flue gas is then burned in the boiler, resulting in a cleaner output containing significantly less nitrous oxide."

with

--The present invention is a system and method of reducing nitrogen oxides in coal combustion exhaust gases and preventing fire and explosion in pulverized coal systems. The present invention first cools the flue gas exiting a boiler of the pulverized coal system with an air preheater. The present invention removes any particles such as fly ash from the cooled flue gas with an electro-static precipitor or a bag house and recirculates a portion of the flue gas. The temperature of the mixture of recirculated flue gas and combustion air is adjusted to a desired temperature and is injected into the pulverizer with combustion air from the air preheater, creating a safer, less flammable, environment for pulverizing the fuel. This mixture of pulverized fuel, air and recirculated flue gas is then burned in the boiler, resulting in a cleaner output containing significantly less nitrous oxide.--

IN THE SPECIFICATIONS

Column 4, line 62, please replace "30" with -- 306 -- so that the corresponding phrase reads --the air preheater 306,--.

Column 5, line 15, please replace "4036" with -- 406 -- so that the corresponding phrase reads --air preheater 406--.

UNITED STATES PATENT AND TRADEMARK OFFICE
CERTIFICATE OF CORRECTION

PATENT NO. : 7,261,046 B1
APPLICATION NO. : 10/866355
DATED : August 28, 2007
INVENTOR(S) : Terry W. Rettig et al.

It is certified that error appears in the above-identified patent and that said Letters Patent is hereby corrected as shown below:

IN THE SPECIFICATIONS (cont'd)

Column 6, lines 4-18, please replace the paragraph
"The present invention is a system and method of reducing nitrogen oxides in coal combustion exhaust gases and preventing fire and explosion in pulverized coal systems. The present invention first cools the flue gas exiting a boiler of the pulverized coal system with an air preheater. The present invention removes any particles such as fly ash from the cooled flue gas with an electro-static precipitor or a bag house and recirculates a portion of the flue gas. The temperature of the mixture of recirculated flue gas and combustion air is adjusted to a desired temperature and is injected into the pulverizer with combustion air from the air preheater, creating a safer less flammable environment for pulverizing the fuel. This mixture of pulverized fuel, air and recirculated flue gas is then burned in the boiler, resulting in a cleaner output containing significantly less nitrous oxide."
with the following
--The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device of the present invention could be implemented in several different ways and have several different appearances.--

Signed and Sealed this

Twentieth Day of November, 2007

JON W. DUDAS
*Director of the United States Patent and Trademark Office*